Figure 2:
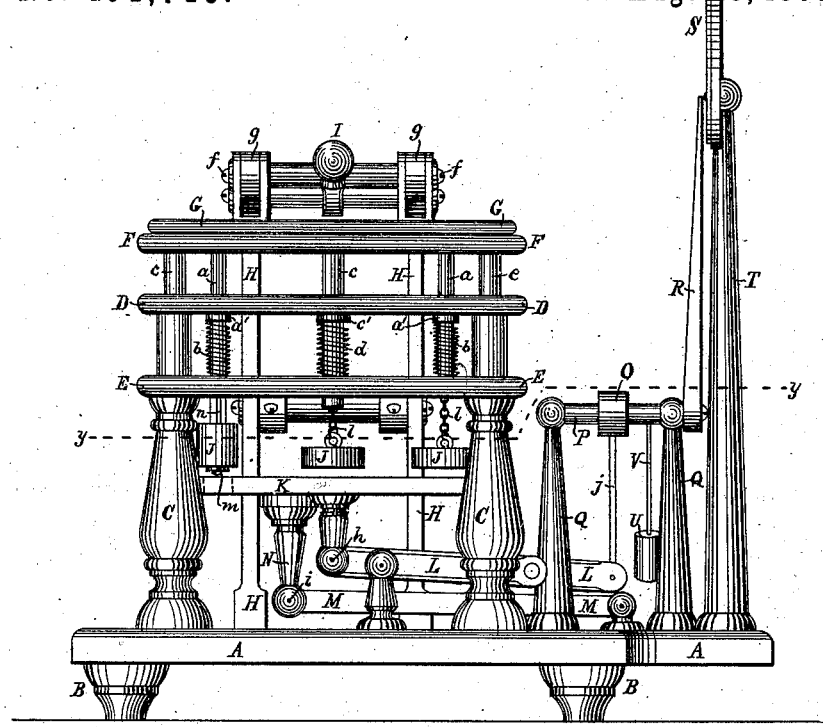

3 Sheets—Sheet 1.

F. F. TAPLEY & C. H. PORTER.
DEVICE FOR AUTOMATICALLY MEASURING THE SUPERFICIAL AREA OF SIDES OF LEATHER, &c.

No. 194,743. Patented Aug. 28, 1877.

WITNESSES.
N. C. Lombard
E. A. Hemmenway

INVENTOR.
Fred. F. Tapley
Cyrus H. Porter

3 Sheets—Sheet 2.

F. F. TAPLEY & C. H. PORTER.
DEVICE FOR AUTOMATICALLY MEASURING THE SUPERFICIAL AREA OF SIDES OF LEATHER, &c.

No. 194,743. Patented Aug. 28, 1877.

WITNESSES.
N. C. Lombard,
E. A. Hemmenway.

INVENTOR.
Fred F. Tapley
Cyrus H. Porter

3 Sheets—Sheet 3.

F. F. TAPLEY & C. H. PORTER.
DEVICE FOR AUTOMATICALLY MEASURING THE SUPERFICIAL AREA OF SIDES OF LEATHER, &c.

No. 194,743. Patented Aug. 28, 1877.

WITNESSES.
N. C. Lombard,
E. A. Hemmenway

INVENTOR.
Fred. F. Tapley
Cyrus H. Porter

UNITED STATES PATENT OFFICE.

FRED. F. TAPLEY, OF LYNN, AND CYRUS H. PORTER, OF EAST STOUGHTON, MASSACHUSETTS.

IMPROVEMENT IN DEVICES FOR AUTOMATICALLY MEASURING THE SUPERFICIAL AREA OF SIDES OF LEATHER, &c.

Specification forming part of Letters Patent No. 194,743, dated August 28, 1877; application filed April 25, 1877.

*To all whom it may concern:*

Be it known that we, FRED. F. TAPLEY, of Lynn, in the county of Essex, and CYRUS H. PORTER, of East Stoughton, in the county of Norfolk and State of Massachusetts, have invented a new and useful Surface-Measuring Machine, of which the following, taken in connection with the accompanying drawings, is a specification:

Our invention relates to a machine for automatically indicating the superficial area of leather or other thin flat articles; and it consists, first, in the use, in combination with a weighing-scale and an index operated thereby, of a series of weights suspended above the platform of said scale at points equidistant from each other, and each representing a given fractional part of a square foot of area, and adapted to be automatically deposited upon the platform of the weighing device, either separately, collectively, or any given number thereof, according to the area of the object to be measured.

Our invention further consists in the use of a skeleton frame, mounted in a horizontal position upon springs, in combination with a hinged and pivoted plate or follower of about the same area, and adapted to be turned upward away from said skeleton frame to allow the object to be measured to be placed on said frame, and then to be turned down upon the object resting upon the frame, and clamps said object between it and the frame, and holds it in an extended position while the frame and plate and the object clamped between them are all moved bodily downward to effect the registration of the measurement.

Our invention further consists in the use, in combination, of a yielding frame or table, a pair of fixed tables or plates, placed one above the other, a series of spring-supported pins working through both of said fixed tables, and arranged equidistant from each other, and each representing a given area of surface, and a hinged or pivoted plate or follower, provided with a series of holes or openings therein, corresponding in number and position to the series of spring-pins, all arranged in such a manner that when a side of leather or other object is placed upon the skeleton frame or table, and the follower is then brought down upon it, and the whole is then pressed downward, such of the yielding pins as are covered by the leather or other object to be measured will be depressed, and convey the proper indication to the measuring or weighing device, while those pins not covered by the object to be measured will pass through the holes in the follower, and will not be depressed, and therefore will give no indication, substantially on the principle of the "Jacquard."

Our invention further consists in the use, in combination, of a yielding skeleton frame or table, a series of yielding pins, arranged equidistant from each other, and each representing a given area of surface, and provided with a weight so attached thereto that it will move downward with said pin till arrested by coming in contact with the platform of the weighing device, and then allow the pin to continue its downward motion, a hinged follower, provided with a series of holes or openings corresponding in number and position to the yielding pins, and a weighing device provided with an index and a gratuated scale, adapted to indicate at a glance the measurement of the side of leather or other object placed between the follower and the yielding table.

Figure 1:
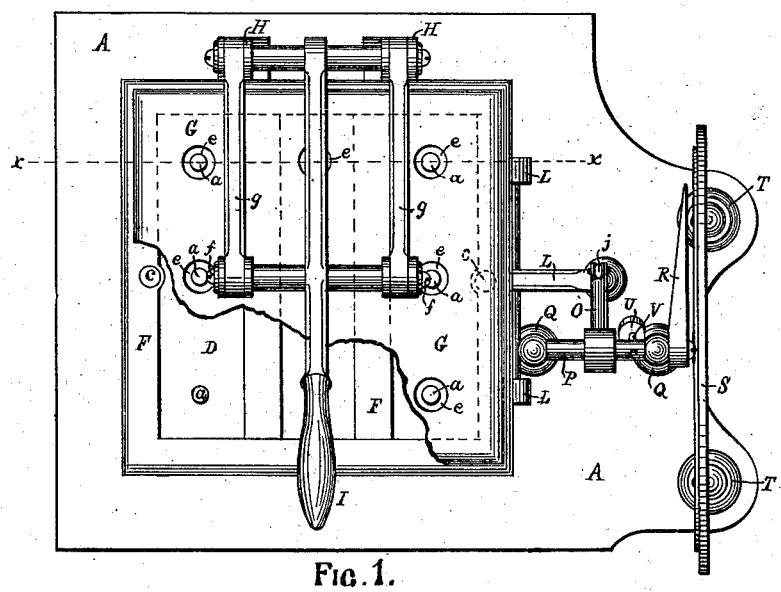
Figure 3:
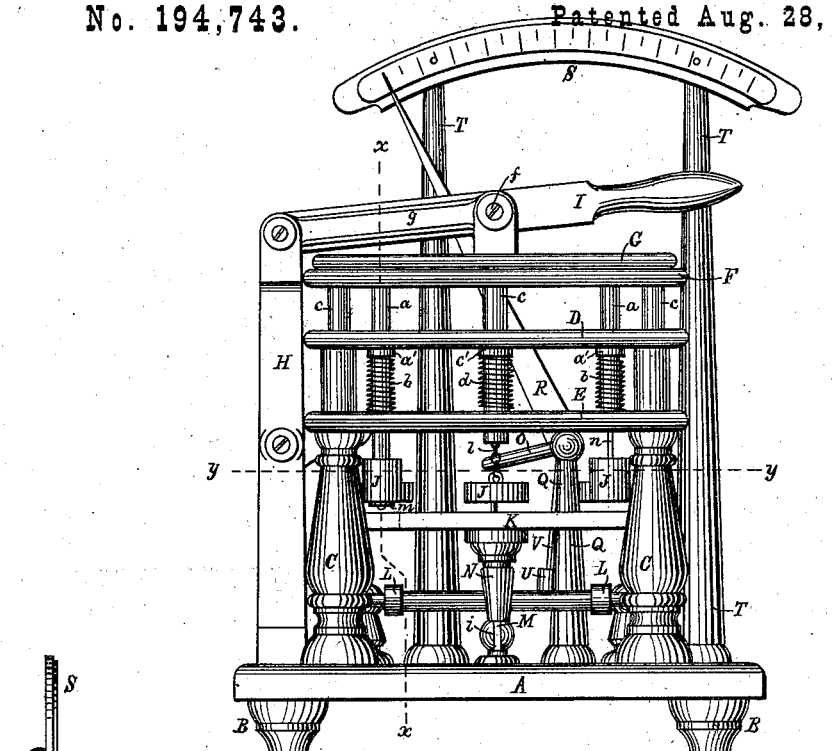
Figure 4:
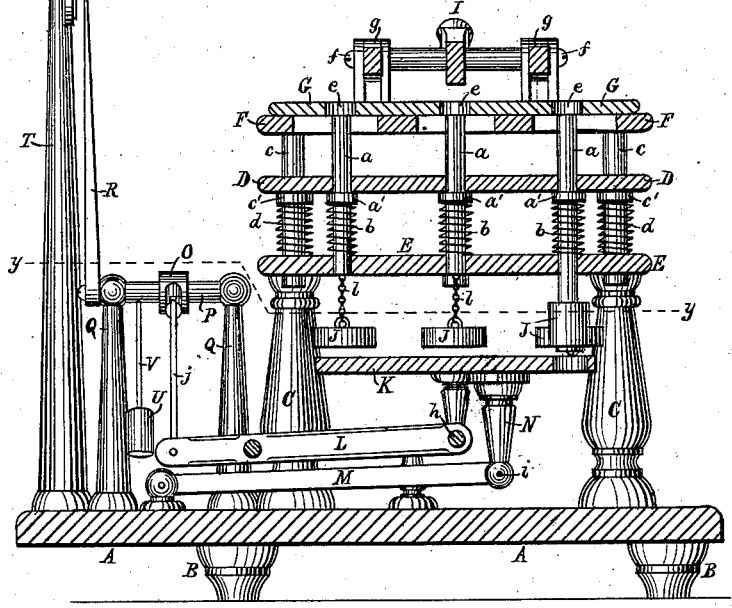
Figures 6, 7:
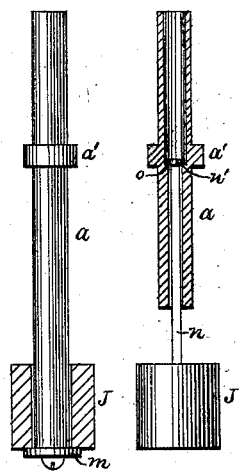
Figure 5:
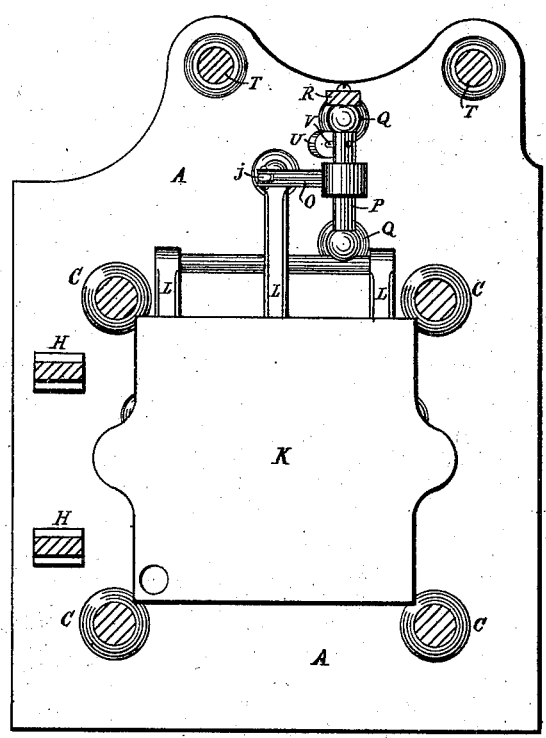

Figure 1 of the drawings is a plan of our measuring-machine with a portion of the follower broken away. Fig. 2 is a front elevation. Fig. 3 is a side elevation. Fig. 4 is a vertical section on line $x\ x$ on Figs. 1 and 3. Fig. 5 is a horizontal section on line $y\ y$ on Figs. 2, 3, and 4; and Figs. 6 and 7 illustrate modifications of the method of hanging the weights.

A is a platform, supported upon the legs B B, and from which rise the four standards C C.

D and E are two platforms or tables, secured to the standards C C in fixed positions, parallel to each other, and each provided with a series of holes arranged in rows, and equidistant from each other, the holes in one table being directly over those in the other table, and having mounted therein the pins $a\ a$, each provided with the collar $a'$ to limit its upward movement by coming in contact with the under side of the table D, against which it is forced by the spiral spring $b$, which surrounds the pin $a$, with one end bearing against said collar $a'$ and the other end resting on the upper surface of the table E.

F is a skeleton frame or table, resting upon or secured to the four vertical pins $c\ c$, which play through bearings in the tables D and E, and are provided with the collars $c'\ c'$ and the spiral springs $d\ d$, surrounding said pins between the collars $c'\ c'$ and the table E, the tension of which springs tends to force the table F upward till the collars $c'\ c'$ come in contact with the under side of the table D, when the upper surface of the table F is on a line with or slightly above the upper ends of the pins $a\ a$.

G is a platen or follower, provided with a series of holes, $e\ e$, corresponding in number and position to the pins $a\ a$, and pivoted at $f$ to the radius-links $g\ g$, which, in their turn, are pivoted to the upper ends of the standards H H in such a manner that the follower G may be swung upward away from the table F to enable the operator to place the article to be measured upon the table F.

I is a handle, by which the follower G is operated.

J J are a series of weights, attached by a flexible or sliding connection one to the lower end of each of the pins $a\ a$, in such a manner that when said pins stand in their normal position the bottoms of said weights shall be a short distance above the upper surface of the platform K of a weighing mechanism.

The platform K is pivoted at $h$ to the short arm of the beam-frame L, and held in a horizontal position by the radius-link M, pivoted at $i$ to the stud N, projecting downward from the under side of said platform.

The long arm of the beam-frame L is connected by the link $j$ to the movable end of the lever O, secured upon the rocker-shaft P, mounted in bearings in the upper ends of the posts Q Q, and carrying on its outer end the index-finger R.

S is a graduated segment secured to the upper ends of the two posts T T, and U is a counterpoise-weight attached to the movable end of the arm V, projecting radially from the rocker-shaft P.

The operation of our invention is as follows: The follower G is thrown upward at right angles to the table F, and the article to be measured is spread out upon the table F, covering more or less of the pins $a\ a$, according to its size. The follower G is then swung down upon the leather or other object to be measured, clamping it between it and the table or frame F. Power is then applied to the handle I to press the follower G and the frame or table F, with the leather or other article clamped between them, downward till the frame F rests on the table D. By this downward movement of the follower G and frame F all of the pins $a\ a$ that are covered and prevented from passing through the holes $e\ e$ in the follower by the leather or other article being measured will be moved downward through the tables D and E, compressing the springs $b\ b$, and carrying with them the weights J J, till said weights come in contact with and rest upon the platform K, when, by virtue of the flexible or sliding connection of said weights with the pins $a\ a$, their weight is deposited upon the platform and removed from the pins $a\ a$. The depositing of the weights J J causes the platform K and the short arm of the beam-frame L to be depressed, and the long arm of the beam-frame L is correspondingly raised, causing the index-finger R to be moved about the axis of the rocker-shaft P and along the graduated scale a distance proportioned to the number of weights deposited on the platform K. When the pressure is removed from the handle I all the parts immediately assume their normal condition again, when the follower is raised to a perpendicular position, when the skin or side of leather is removed and another placed on the frame F, and the operations are repeated.

The scale S should be graduated to indicate square feet and fractional parts thereof, and to correspond to the number of the pins $a\ a$ and the weights J J.

The weights J J may be attached to the pins $a\ a$ by means of the chains $l\ l$, as shown, or by a cord or other flexible connection; or the weight J may be made annular and the pin $a$ may move through the weight and through a hole formed for the purpose in the platform K, when the weight has been deposited on the platform K, said weight being taken up again when the rod $a$ rises by the collar $m$ on the lower end of the rod $a$, as shown in the modification at Fig. 6.

Another modification of the mode of hanging the weight is shown in Fig. 7, where the pin $a$ is made hollow, the upper portion being chambered out larger than the lower portion, and the weight J having screwed into its upper end the stem $n$, provided at its upper end with a head, $n'$, which rests on the shoulder $o$ in the hollow pin $a$ when said pins are in their normal position, and when depressed the hollow sleeve, like pin $a$, moves along the stem $n$ after the weight is deposited upon the platform K.

The tables D, E, and F and the platen or follower G should be made of sufficient area to receive the largest side of leather or other article that it is desired to measure, and there should be a pin, $a$, and weight J to every quarter, eighth, or sixteenth of a square foot area contained in said tables, according to the degree of accuracy desired in the measurement.

What we claim as new, and desire to secure by Letters Patent of the United States, is—

1. In combination with the platform of a weighing-scale and an index-finger operated thereby, a series of weights suspended above said platform at points equidistant from each other, and each representing a given fractional part of a square foot of area, and adapted to be automatically deposited, one or all, upon the platform of the weighing-scale by a downward movement of the object to be measured, substantially as described.

2. The combination, in a surface-measuring machine, of the hinged and pivoted platen or follower G, and the spring supported or yielding frame or table F, adapted to clamp the object to be measured between them, and then to be moved bodily downward to effect the registration of the measurement, substantially as described.

3. In a surface-measuring machine, the combination of the hinged and pivoted platen G, having formed therein a series of holes, $e\ e$, the yielding frame or table F, and a series of spring-supported pins, $a\ a$, arranged equidistant from each other, and each representing a given area of surface, and adapted to be pressed downward by the object to be measured, and thus indicate to the registering device the area of the object being measured, substantially as described.

4. In a surface-measuring machine, the combination of the tables D, E, and F, the platen G, provided with the holes $e\ e$, the pins $a\ a$, provided with the collars $a'\ a'$, and the springs $b\ b$, all arranged and adapted to operate substantially as and for the purposes described.

5. In combination with a weighing device provided with an index-finger and a graduated scale representing square feet and fractional parts thereof, the yielding table F, a series of spring-supported pins, $a\ a$, arranged equidistant from each other, and each representing a given area of surface, and having attached thereto, by a flexible or sliding connection, the weights J J, and the hinged and pivoted platen G, provided with a series of holes, $e\ e$, corresponding in number and location to the pins $a\ a$, all arranged and adapted to operate substantially as and for the purposes described.

6. In a machine for measuring surfaces, the combination of a weighing mechanism provided with an index-finger and a scale graduated to represent square feet and fractional parts thereof, a Jacquard mechanism for determining the area of the object to be measured, and a series of weights adapted to be deposited upon the platform of the weighing mechanism by the movement of the Jacquard mechanism, substantially as described.

Executed at Boston, Massachusetts, this 21st day April, A. D. 1877.

FRED. F. TAPLEY.
CYRUS H. PORTER.

Witnesses:
   N. C. LOMBARD,
   BENJ. ANDREWS.